April 17, 1934.   G. A. M. LAMBLIN-PARENT   1,955,600

HEADLIGHT

Original Filed July 23, 1929   2 Sheets-Sheet 1

Inventor

GUSTAVE A. M. LAMBLIN-PARENT

Dorsey & Cole

Attorney

April 17, 1934.    G. A. M. LAMBLIN-PARENT    1,955,600
HEADLIGHT
Original Filed July 23, 1929    2 Sheets-Sheet 2
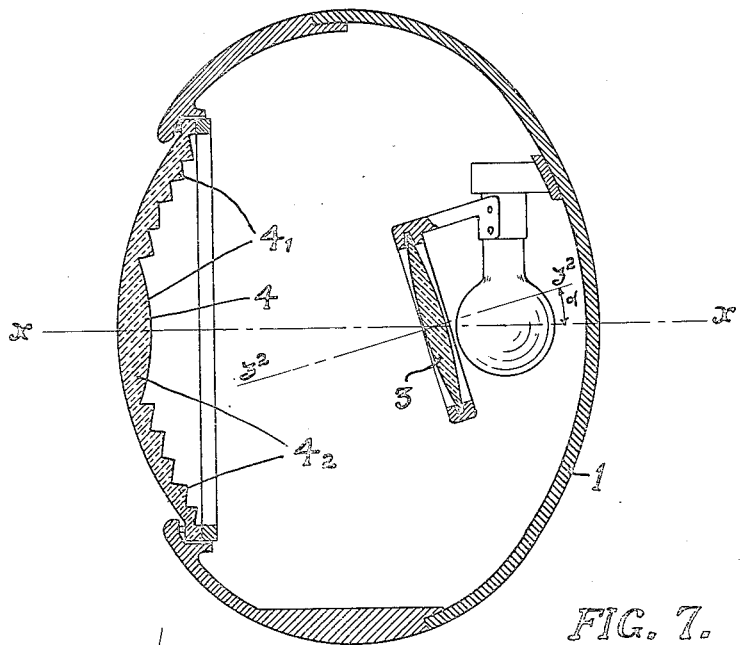
FIG. 7.
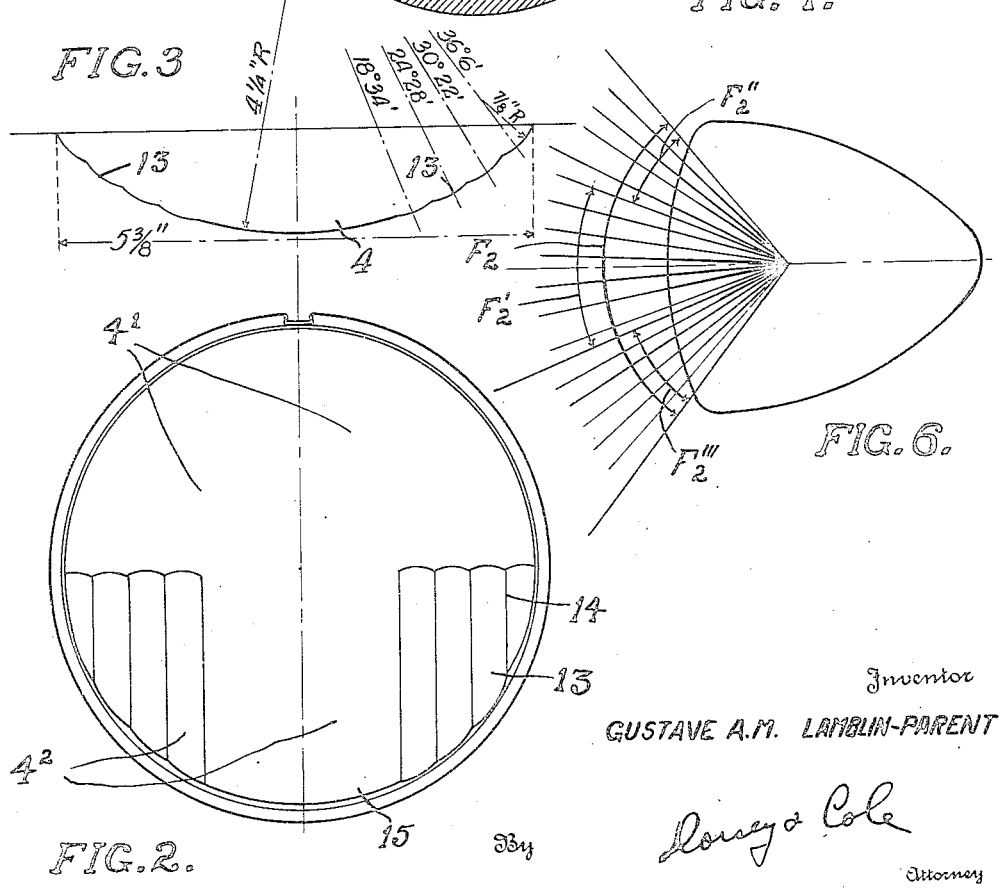
FIG. 3.
FIG. 6.
FIG. 2.
Inventor
GUSTAVE A.M. LAMBLIN-PARENT
By Dorsey & Cole
Attorney Patented Apr. 17, 1934

1,955,600

UNITED STATES PATENT OFFICE 1,955,600

HEADLIGHT

Gustave Alphonse Marie Lamblin-Parent, Ronchin, near Lille, France, assignor, by mesne assignments, to United States Holding Corporation, a corporation of Delaware Application July 23, 1929, Serial No. 380,281
Renewed November 2, 1933. In France January 26, 1929

5 Claims. (Cl. 240—41.3)

The present invention relates to improvements in headlights for motor cars, or the like, which prevent the formation of stray or improperly directed rays in the parallel beam of the headlight, said rays having a glaring effect when they proceed at a certain angle above the horizontal.

The invention has further for its object to afford the maximum increase of the luminous intensity of the headlight by utilizing the maximum value of the illuminant in the beam issuing from the apparatus.

The said invention has further for its object to provide a headlight which will readily give exact indications of the position of the vehicle to the drivers of the succeeding vehicles.

The invention has also for its object to increase the rays of the issuing beam which diverge below the horizontal, so as to light the parts of the road adjacent the vehicle, but without producing a glaring effect upon the drivers of vehicles coming in the other direction.

The following description and appended claims relate to headlights embodying the above-mentioned features, with reference to the accompanying drawings.

Fig. 2 is a front view of the lens situated at the front of the headlight.

Fig. 3 is a bottom plan view of the said lens, constructional data for the curvature of the outer surfaces of the prisms being illustrated.

Fig. 6 is a diagrammatic plan view of the lower half of the beam issuing from the headlight.

Fig. 7 is a partial section of a modified construction of the apparatus according to the invention.

Figure 1:
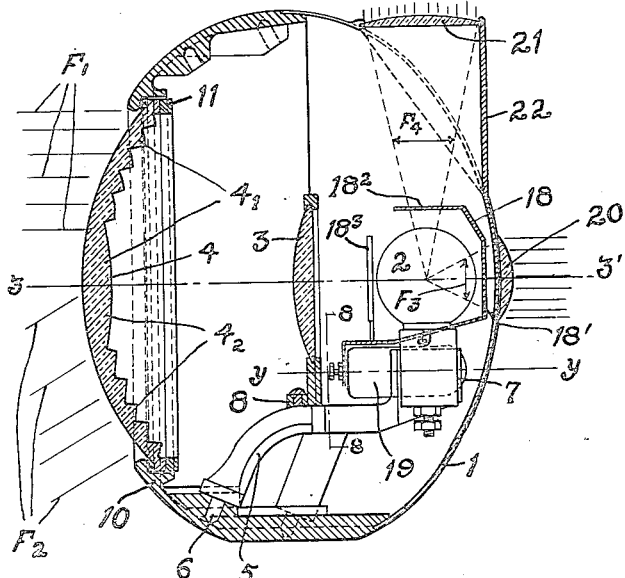
Fig. 1 is a vertical section of a headlight according to the invention.
Figure 4:
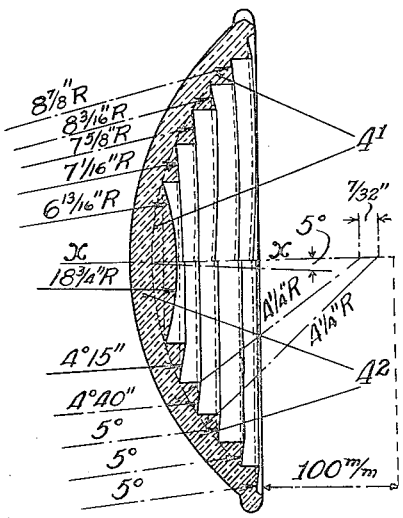
Fig. 4 is a vertical longitudinal section of the lens, whose focal distance is 100 mm.

The headlight shown in Figures 1 to 5 comprises a casing 1 of general parabolic form, for example, but which may be spherical or cylindrical, or these different forms combined, in which are mounted an electric lamp 2, a condensing lens 3 and a modified Fresnel lens 4. The lamp 2 and the condenser 3 are mounted respectively at 7 and 8 on an arm 5 which is secured by screws 6 to the interior of the casing 1. The said Fresnel lens 4 is mounted in an edge portion 10 of the said casing, and is held therein by a ring 11.

The said Fresnel lens 4 consists of an upper part $4^1$ which produces a beam of parallel rays $F_1$, and of a lower part $4^2$ producing a divergent beam $F_2$. The parallel beam $F_1$ serves to light the distant part of the road for the motor car, and it should comprise no rays diverging above the horizontal, which would have a glaring effect upon the drivers of vehicles coming in the opposite direction.

The beam $F_2$ which diverges to the ground and below the horizontal, lights the road next the motor car.

Figure 5:
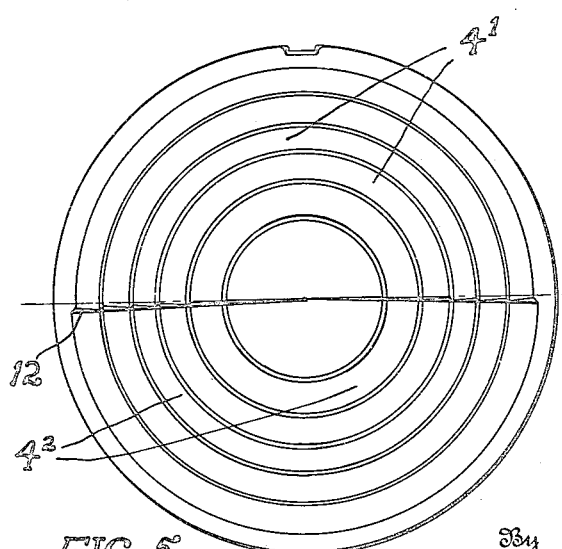
Fig. 5 is a rear view of the lens.
Figure 8:
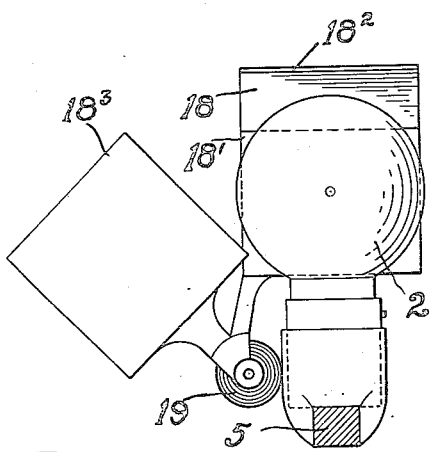
Fig. 8 is a fragmentary transverse section taken in front of the lamp on the line 8—8 of Fig. 1.

The Fresnel lens 4 whose focal distance is 100 mm. but which may have a longer or shorter focus, has an outer convex surface and an inner surface consisting of parts or steps of different radii in the upper part $4^1$, and of other parts or steps of different radii at the lower part $4^2$, and five such parts or steps may be used. These different parts are joined by surfaces 12 (Fig. 5) which make a certain angle, for instance 5°, with the optical axis of the lens $xx$, in order to obviate glaring stray rays. As shown in Figure 5 the surfaces 12 are triangular in shape and are arranged at an angle to the steps of the upper and lower parts of the lens.

The said Fresnel lens 4 has on its outer surface the flutes 13 forming lateral sides. The edges of junction 14 between said flutes are situated in vertical planes parallel to the optical axis $xx$. The radii of curvature of the outer surfaces of said flutes are shown in Figure 3. These radii can be modified according to the amount of divergence desired.

The said flutes 13 act to increase the angle of divergence of the beam $F_2$, which beam thus consists of a central part $F''_2$ of a more concentrated nature having a horizontal angle equal to substantially 40°, for example, and corresponding to the central part 15 of the lens, and of two lateral parts $F''_2$ $F'''_2$ whereof each has a horizontal angle of 30°. The said lateral beams are less concentrated than the central beam $F'_2$ but will however suffice to light the sides of the road next the car or the pavement.

The resulting complex beam has a total divergence of about 100°, which is quite sufficient to light the sides of the road next the car. However, all of the rays of said beam $F_2$ will diverge towards the ground, and will not have a glaring effect on the drivers of vehicles coming in the other direction.

The said headlight also comprises a rotatable screen 18, consisting of three parts $18^1$, $18^2$, $18^3$ and mounted on a rotatable element such as an armature winding 19, and the said screen may turn freely on the axis $yy$.

The part 18¹ of the screen 18 may be placed between the lamp 2 and a colored glass plate 20 disposed at the rear of the casing 1.

The top part 18² of said screen may be disposed between the lamp 2 and a glass plate 21 mounted in an upper chimney 22 of the casing 1.

The front part 18³ of the said screen may be placed between the lamp 2 and the condenser 3. This front part consists of a colored glass plate (green or other), so that when the said plate comes between the lamp 2 and the condenser 3 it will intercept the beam of white light from the lamp and will convert it into a non-glaring signal beam of colored light.

The said device operates in the following manner. In the case of the normal functioning, the parts 18¹, 18² of the screen intercept the light from the lamp 2 at the top and rear. The front part 18³ of the screen beam is set aside and thus allows the front beam to pass, which beam falls upon the condenser 3, and when it is brought upon the Fresnel lens 4, it forms the issuing beams F₁, F₂.

On the contrary, when the car with its headlight meets another car coming in the opposite direction, the driver closes the circuit of the windings 19, thus rotating the screen 18. The front part of the screen 18³ comes between the lamp 2 and the condenser 3, and thus converts into colored and non-glaring light the beam falling on the condenser, and hence the beam F₁, F₂ from the Fresnel lens 4.

The rear part 18¹ and the top part 18² of the screen 18 will uncover the lamp during the same movement, so that the rear beam F₃ from said lamp will strongly light the back colored glass plate 20, and the upper beam F₄ will light the glass plate 21, thus producing an issuing beam in practically the vertical direction.

The two beams F₃, F₄ will thus give a warning to the drivers of the succeeding vehicles, and the beam F₄ indicates in an exact manner the position of the car carrying the headlight.

This arrangement obviates all contact or collision between motor cars.

In the headlight shown in Figure 1, the condenser 3 is mounted in the casing 1 of the headlight in such manner that its optical axis will coincide with the optical axis of the Fresnel lens 4 as indicated by the line $z—z'$, the condenser having a practically vertical position.

As shown in Figure 7, it is also feasible to dispose the condenser 3 in such manner that its optical axis $z^2—z^2$ will make an angle with the axis $xx$ of the Fresnel lens 4, and this arrangement serves to reinforce the lower divergent beam F₂ and hence to obtain the proper lighting of the road at the sides of the vehicle, by deflecting a part of the light to the lower beam wherein the rays, by virtue of their initial dispersion, will have their power much reduced.

The foregoing detailed description of the invention has been given for illustrative purposes, and it will be understood that no undue limitations should be deduced therefrom, but that variations in the construction, combination and arrangement of parts, and the uses to which the invention may be put, may be made within the range of equivalents to which the invention is entitled, without departing from the scope of the claims.

Inasmuch as subject-matters having to do with the modified Fresnel lens, and the condenser, and the optical characteristics of the invention, are disclosed in my co-pending applications, Serial Numbers 414,749, 428,876, and 554,111, filed in part as continuations hereof which applications will issue into patents on the same day with this application, and claims to such subject-matters are being made in my said other applications, I am making in this application claims only to the subject-matter including the screen system in its relationship to other parts, whereby a colored beam may issue from the lens, and signalling beams may be issued from the casing.

What is claimed is:

1. In a headlight, a casing, an illuminant mounted in said casing, a modified Fresnel lens mounted in said casing and comprising an upper part having successive refracting steps of different radii producing a beam of parallel rays and a lower part having refractive steps differing in radii from those of the upper part producing a beam of downwardly diverging rays directed towards the sides of the road, a screen of a colored transparent substance normally disposed to one side of the axis of the headlight and movable in the said casing and adapted to be displaced in such manner that it will intercept the rays to the said lens and thus convert the issuing beam of the headlight into a beam of colored and non-glaring light, and means for displacing the said screen.

2. In a headlight, a casing, a colored glass plate mounted at the rear of said casing, a glass plate mounted at the upper part of said casing, an illuminant disposed in said casing, a modified Fresnel lens mounted in said casing and comprising an upper part having refracting steps of successively increasing length of radii as the steps are removed from the optical axis of the lens producing a beam of parallel rays, and a lower part having refracting steps the radii of which differ from those of the upper steps producing a beam of downwardly diverging rays directed towards the sides of the road, an opaque screen movable in said casing having a part adapted to be interposed between the said illuminant and the upper glass plate and to thus intercept the beam sent upwardly by the illuminant, and having a part adapted to be interposed between said illuminant and said Fresnel, in order to indicate the position of the vehicle to the driver of a following vehicle or a vehicle coming from a cross road, and means for displacing said screen.

3. In a headlight, a casing, a colored glass plate mounted at the rear of said casing, a glass plate mounted at the upper part of said casing, an illuminant disposed in said casing, a modified Fresnel lens mounted in said casing and comprising an upper part having refracting steps of successively differing radii producing a beam of parallel rays, and a lower part having refracting steps which differ in curvature from those of the upper part producing a beam of downwardly diverging rays directed towards the sides of the road, a screen movable in said casing and comprising three parts whereof one part may intercept the rays to the lens, the second part may be interposed between the illuminant and the rear colored glass plate in order to cut off the signal beam sent to the rear by the illuminant, and the third may be interposed between the illuminant and the upper glass plate, thus intercepting the beam sent upwardly by the illuminant to indicate the position of the vehicle to the driver of a following vehicle or of a vehicle coming from a cross road, and means for displacing said screen.

4. A light projector comprising a casing provided with front, rear and top light-emitting openings, a light source within the casing, a modified Fresnel lens covering the front opening and having upper and lower sections provided with steps of differing curvatures, a screen within the casing comprising a forward colored transparent portion movable between the light source and the lens and opaque rear and top portions movable between the light source and the rear and top openings, the colored portion being out of alignment with the opaque portions, and means to operate the screen so as to position the colored portion between the light source and the lens or to position the opaque portions between the light source and the rear and top openings.

5. A light projector comprising a casing having forward, rear, and top light-emitting openings, a light source within the casing, a modified Fresnel lens covering the front opening and having upper and lower sets of refractive zones of varying curvature, a movable screen in the casing having a forward colored transparent portion and opaque rear and top portions so disposed with relation to each other and to the light source that upon movement of the screen either a colored beam will issue from said lens by passing first through the colored portion of the screen and beams will issue from said rear and top openings, or an uncolored beam will issue through said lens and no beams will issue through said rear and top openings, and means for operating the screen.

GUSTAVE ALPHONSE MARIE
LAMBLIN-PARENT.